US008838545B2

(12) United States Patent
Tevis et al.

(10) Patent No.: US 8,838,545 B2
(45) Date of Patent: Sep. 16, 2014

(54) INCREMENTAL AND PRIORITIZED RESTORATION OF BLOCKS

(75) Inventors: Gregory John Tevis, Tucson, AZ (US); Oren Wolf, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/693,245

(22) Filed: Jan. 25, 2010

(65) Prior Publication Data

US 2011/0184916 A1  Jul. 28, 2011

(51) Int. Cl.
*G06F 7/00* (2006.01)
*G06F 17/00* (2006.01)

(52) U.S. Cl.
USPC ............................................. 707/679

(58) Field of Classification Search
None
See application file for complete search history.

(56) References Cited

U.S. PATENT DOCUMENTS

| | | | |
|---|---|---|---|
| 5,765,173 A * | 6/1998 | Cane et al. ................... | 707/640 |
| 7,020,798 B2 | 3/2006 | Meng et al. | |
| 7,149,946 B2 | 12/2006 | Peretz et al. | |
| 7,194,487 B1 | 3/2007 | Kekre et al. | |
| 7,685,171 B1 * | 3/2010 | Beaverson et al. .... | 707/999.202 |
| 2004/0080558 A1 | 4/2004 | Blumenau et al. | |
| 2005/0216788 A1 | 9/2005 | Mani-Meitav et al. | |
| 2007/0276885 A1 | 11/2007 | Valiyaparambil et al. | |
| 2008/0183975 A1 * | 7/2008 | Foster et al. .................. | 711/153 |
| 2009/0031097 A1 | 1/2009 | Nelson | |

* cited by examiner

*Primary Examiner* — Usmaan Saeed
*Assistant Examiner* — Michele Choi
(74) *Attorney, Agent, or Firm* — Rabindranath Dutta; Konrad Raynes Davda & Victor LLP (57) ABSTRACT

A first computational platform generates a data structure that indicates a set of blocks, wherein the indicated set of blocks have to be rewritten to revert a logical storage structure stored in the first computational platform to a previous state. An Input/Output (I/O) request that corresponds to a read operation on a selected block of the logical storage structure is received. A determination is made from the data structure that the selected block has to be rewritten to revert the logical storage structure stored in the first computational platform to the previous state. The first computational platform receives the selected block from a second computational platform, in response to a request made by the first computational platform to the second computational platform for the selected block.

12 Claims, 6 Drawing Sheets

INCREMENTAL AND PRIORITIZED RESTORATION OF BLOCKS

BACKGROUND

1. Field

The disclosure relates to a method, a system, and a computer program product for incremental and prioritized restoration of blocks.

2. Background

An application that executes on a production server may backup data into a backup server. The application may perform the backup of the data via one or more backup mechanisms or via a combination of one or more backup mechanisms. Such backup mechanisms may include full backup mechanisms, incremental backup mechanisms, differential backup mechanisms, etc.

A user may initiate a restore procedure in the application that executes on the production server. In response to the initiation of the restore procedure, data may be transferred back from a backup media associated with the backup server to a designated target, such as storage associated with the production server.

Restoration of data by a user may be needed in response to logical corruption of data, user errors, file system corruption, execution of virus programs, etc. Certain restore procedures may overwrite information that already exists in the designated target while restoring data from a backup server. Restore procedures may be time consuming when the user restores large amounts of data. The time for restoration of the data may be dependent on a plurality of factors, such as, the backup media that was used to store the data, the type of network that is used for data restoration, read speeds from the backup media, write speeds to the target, etc.

SUMMARY OF THE PREFERRED EMBODIMENTS

Provided are a method, a system, and a computer program product, wherein a first computational platform generates a data structure that indicates a set of blocks, and wherein the indicated set of blocks have to be rewritten to revert a logical storage structure stored in the first computational platform to a previous state. An Input/Output (I/O) request that corresponds to a read operation on a selected block of the logical storage structure is received. A determination is made from the data structure that the selected block has to be rewritten to revert the logical storage structure stored in the first computational platform to the previous state. The first computational platform receives the selected block from a second computational platform, in response to a request made by the first computational platform to the second computational platform for the selected block.

In additional embodiments, restoration of the selected block to the first computational platform is prioritized over any restoration of other blocks by requesting the selected block from the second computational platform prior to requesting the other blocks, wherein prioritized restoration to the first computational platform is performed at a block level. The first computational platform replies to the I/O request that corresponds to the read operation on the selected block of the logical storage structure.

In further embodiments, a determination is made as to whether a block integrity verification indicator indicates that integrity of any received block is to be checked. The first computational platform computes a first signature of the received selected block. The first computational platform transmits the computed first signature and information on the received selected block, to the second computational platform. The first computational platform determines that the received selected block has been restored properly, in response to receiving a reply from the second computational platform that the transmitted first signature corresponding to the selected block matches a second signature computed from a selected backed up block corresponding to the selected block.

In still further embodiments, the logical storage structure is a file, wherein the file is represented by a plurality of blocks, and wherein the I/O request is on the file. The I/O request on the file is completed by executing the read operation on the selected block that has been restored to the first computational platform via the receiving of the selected block, wherein the selected block is restored to the first computational platform from the second computational platform to update the file in the first computational platform, and wherein the selected block represents a part of the file. A requestor of the I/O request is allowed access to selected blocks in the first computational device while a restoration process is being performed to restore any of the plurality of blocks to the first computational device from the second computational device.

In additional embodiments, the logical storage structure is a volume, wherein the volume is represented by a plurality of blocks, wherein the I/O request is on the volume, wherein the first computational platform is a production server coupled to a first set of storage devices, wherein the second computational platform is a backup server coupled to a second set of storage devices, and wherein the second set of storage devices coupled to the backup server backs up blocks of logical data structures initially stored in the production server. A requestor of the I/O request is allowed access to selected blocks in the production server while a restoration process is being performed to restore a plurality of blocks to the production server from the backup server.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A production server backs up blocks of data into a backup server. Certain blocks may become corrupted in the production server after the blocks have been backed up to the backup server. The production server maintains a record of the blocks that may have been corrupted. The production server copies data to the corrupted blocks from the backup server, instead of copying all blocks. While copying data to the corrupted blocks from the backup server, data for blocks that are requested by a user are copied first.

Certain embodiments are provided in which a production server incrementally restores blocks and prioritizes the restoration of certain blocks from a backup server. Incremental and prioritized restoration of blocks may cause a production server to respond to I/O requests faster in comparison to embodiments in which incremental restoration and prioritization of blocks are not performed.

In certain embodiments, full rewrites of files and volumes are avoided by restoring via incremental restore operations only those blocks that may have changed. Certain embodiments allow the usage of files and volumes throughout the restore or incremental restore process, even when the restore has not been completed and this process may be referred to as "instant restore". Certain embodiments also verify the integrity of the restored blocks.

Exemplary Embodiments

Figure 1:
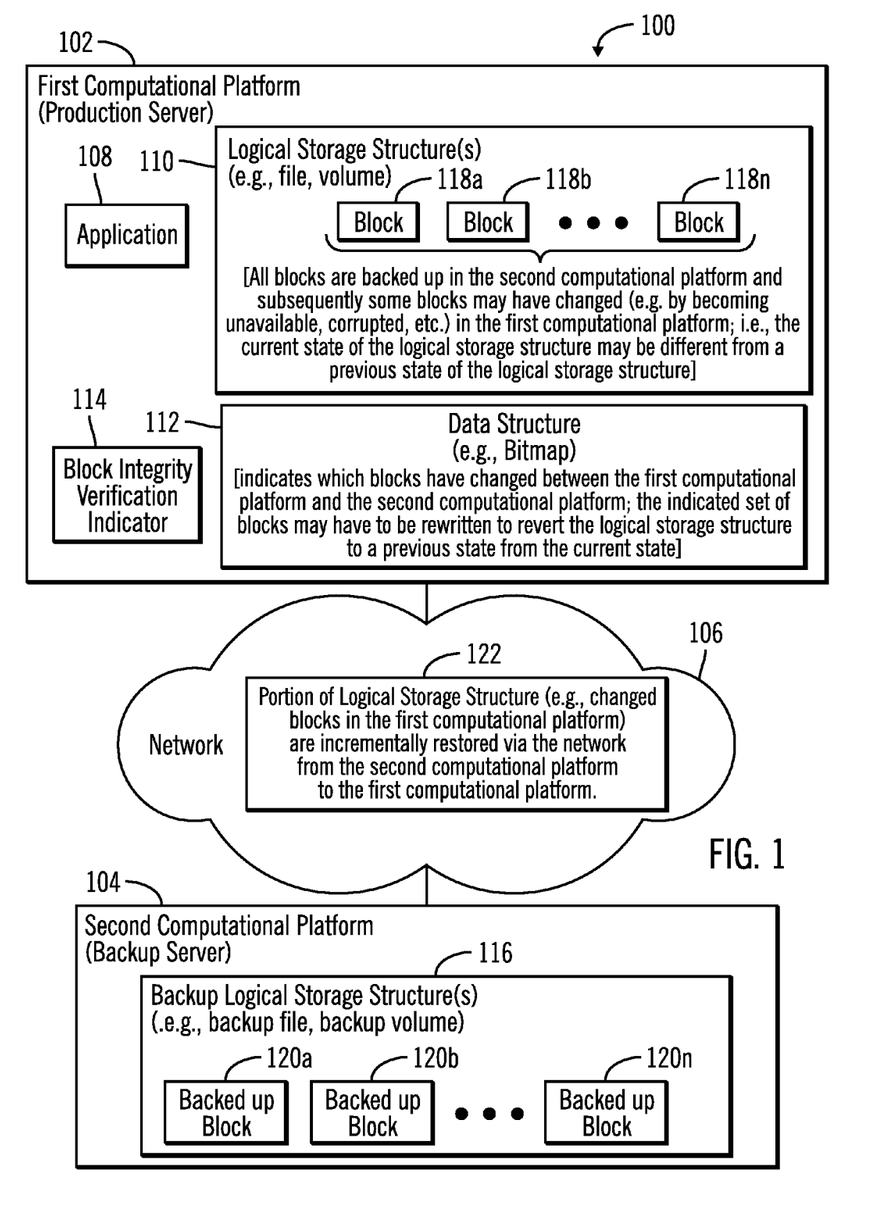
FIG. 1 illustrates a block diagram of a first computational platform coupled to a second computational platform, in accordance with certain embodiments.

FIG. 1 illustrates a block diagram of a computational environment 100 that includes a first computational platform 102 coupled to a second computational platform 104 via a network 106, in accordance with certain embodiments.

In certain embodiments, the first computational platform 102 and the second computational platform 104 may comprise any suitable computational device, including those presently known in the art, such as, a personal computer, a workstation, a server, a mainframe, a hand held computer, a palm top computer, a telephony device, a network appliance, a blade computer, a storage server, etc. The network 106 may be any network known in the art, such as the Internet, an intranet, a Local area network (LAN), a Storage area network (SAN), a Wide area network (WAN), a wireless network, etc. The first computational platform 102 may also be referred to as production server 102 and the second computational platform 104 may also be referred to as a backup server 104. In certain embodiments hardware based storage units (e.g., disk drives, tape drives) that store data may be implemented inside the computational platforms 102, 104 or such hardware based storage units may be coupled to the computational platforms 102, 104.

The production server 102 includes an application 108, one or more logical storage structure 110, a data structure 112, and a block integrity verification indicator 114. The backup server 104 includes one or more backup logical storage structures 116.

The logical storage structure 110 included in the production server 102 may comprise a file, a volume, or any other type of logical storage. In certain embodiments the logical storage structure 110 that is included in the production server 102 may comprise a plurality of blocks 118a, 118b, . . . , 118n, wherein an exemplary block may comprise one or more bits or bytes of storage. The plurality of blocks 118a, 118b, . . . 118n may store data. For example, in certain embodiments in which the logical storage structure 110 is a file, the data stored in the file may be stored in the plurality of blocks 118a, 118b, . . . 118n.

The application 108 may backup data corresponding to the logical storage structure 110 included in the production server 102 to the backup logical storage 116 included in the backup server 104. For example, in certain embodiments the application 108 may backup the blocks 118a, 118b, . . . 118n of the logical storage structure 110 to the plurality of backed up blocks 120a, 120b, . . . 120n.

In certain embodiments, all blocks 118a, 118b, . . . 118n stored in the logical storage structure 110 of the production server 102 at a point in time are backed up in the backup server 104, and subsequent to the backup some of the blocks 118a, 118b, 118n may change. For example, some of the blocks 118a, 118b, . . . 118n may change subsequent to the backup by becoming unavailable, corrupted, etc., in the production server 102. The configuration of the logical storage structure 110 at a particular point is time may be referred to as a state of the logical storage structure 110. If the configuration of the logical storage structure 110 at the point in time at which the logical storage structure 110 has been backed up to the backup server 104 is referred to as a previous state of the logical storage structure, then after certain changes in one or more of the blocks 118a, 118b, . . . 118n of the logical storage structure 110, the current state of the logical storage structure 110 may be different from the previous state of the logical storage structure 110.

The data structure 112 indicates which blocks have changed between the production server 102 and the backup server 104 after a successful completion of the last backup of the logical storage structure 110 to the backup logical storage structure 116, wherein the indicated set of blocks may have to be rewritten to revert the logical storage structure 110 to a previous state from the current state. The data structure 112 may be implemented as a bitmap.

In certain embodiments, a portion of the logical storage structure 110 (e.g., changed blocks in the production server 102) is incrementally restored 122 via the network 106 from the backup server 104 to the production server 102. The portion that may have to be incrementally restored may be indicated by the data structure 112 stored in the production server 102.

In certain embodiments, the block integrity verification indicator 114 indicates whether or not incrementally restored blocks from the backup server 104 to the production server 102 have to be checked for verifying block integrity.

Therefore, FIG. 1 illustrates certain embodiments in which a portion of the logical storage structure 110 may be incrementally restored via the network 106 from the backup server 104 to the production server 102, wherein the portion that is to be incrementally restored may indicated by the data structure 112.

Figure 2:
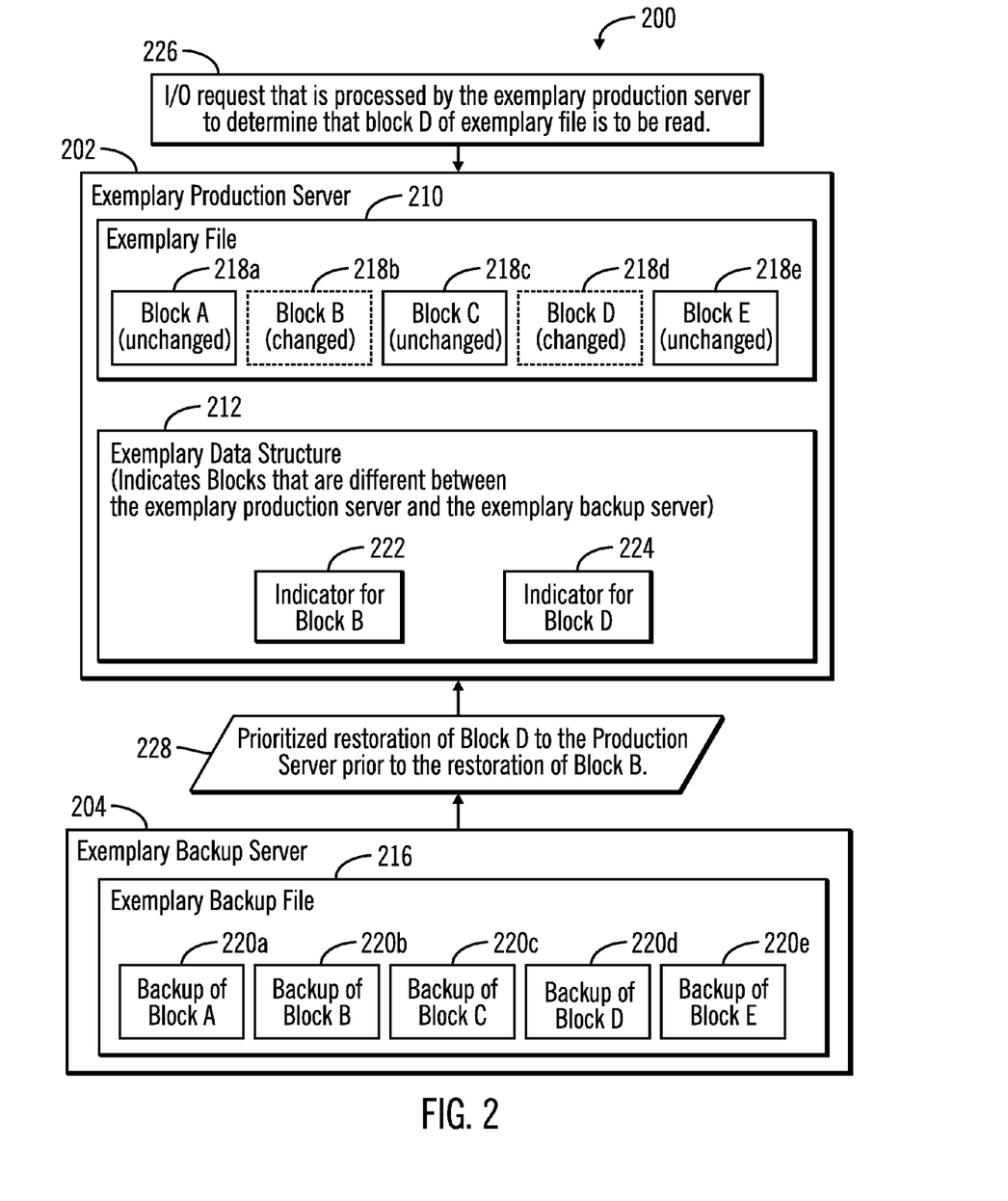
FIG. 2 illustrates a block diagram that shows prioritized restoration of selected blocks to the first computational platform from the second computational platform, in accordance with certain embodiments.

FIG. 2 illustrates a block diagram 200 that shows prioritized restoration of selected blocks to an exemplary production server 202 from an exemplary backup server 204, in accordance with certain embodiments. The exemplary production server 202 may be an instance of the first computational platform 102 shown in the FIG. 1, and the exemplary backup server 204 may be an instance of the second computational platform 104 shown in FIG. 1.

The exemplary production server 202 stores an exemplary file 210, wherein data for the exemplary file 210 is stored in the plurality of blocks shown as block A 218a, block B 218b, block C 218c, block D 218d and block E 218e. At a point in time, the plurality of blocks 218a, 218b, 218c, 218d, 218e of the exemplary file 210 may have been successfully backed up in the plurality of exemplary backup blocks shown as backup block A 220a, backup block B 220b, backup block C 220c, backup block D 220d and backup block E 220e, wherein the plurality of exemplary backup blocks 220a, 220b, 220c, 220*d*, 220*e* may correspond to an exemplary backup file 216. The exemplary backup file 216 corresponds to a backup of the exemplary file 210.

In certain exemplary embodiments, subsequent to a backup of the exemplary file 210 to the backup exemplary file 216, block B 218*b* and block D 218*d* may have changed. For example, the data on block B 218*b* may have become corrupted and data on block D 218*d* may have been inadvertently overwritten. The exemplary data structure 212 that indicates blocks that are different between the exemplary production server 202 and the exemplary backup server 204 maintains an indicator 222 for block B 218*b* that has changed, and an indicator 224 for block D 218*d* that has changed.

In FIG. 2 the exemplary production server 202 receives an Input/Output (I/O) request (reference numeral 226) that is processed by the exemplary production server 202 to determine that block D 218*d* of the exemplary file 218 is to be read. However, block D 218*d* stored in the production server 202 has changed as can be determined from the indicator 224 for block D 218*d* maintained in the exemplary data structure 212. Therefore, based on the read request for block D 218*b* and the indicator 224 for block D 218*d* maintained in the exemplary data structure 212, the exemplary production server 202 performs a prioritized restoration (shown via reference numeral 228) of block D 218*d* to the production server 202 prior to the restoration of block B 218*b* to the production server 202. The prioritized restoration is performed by copying over the backup of block D 220*d* to block D 218*d* that had changed in the production server 202.

In FIG. 2 instead of attempting to restore all changed blocks (i.e., block B 218*b* and block D 218*d*) in no particular order, the production server 202 restores those blocks (e.g., block D 218*d*) that are needed to respond to a read request before restoring other blocks (e.g., block B 218*b*), Therefore, FIG. 2 illustrates certain embodiments in which a prioritized restoration of blocks that are needed for satisfying a read I/O request are performed over restoration of other blocks. As a result, the read I/O requests can be responded to faster in comparison to embodiments in which no prioritization mechanisms are utilized in the restoration of blocks. In certain embodiments, a requestor of the I/O request is allowed access to selected blocks in the production server 102 while a restoration process is being performed to restore a plurality of blocks to the production server 102 from the backup server 104.

Figure 3:
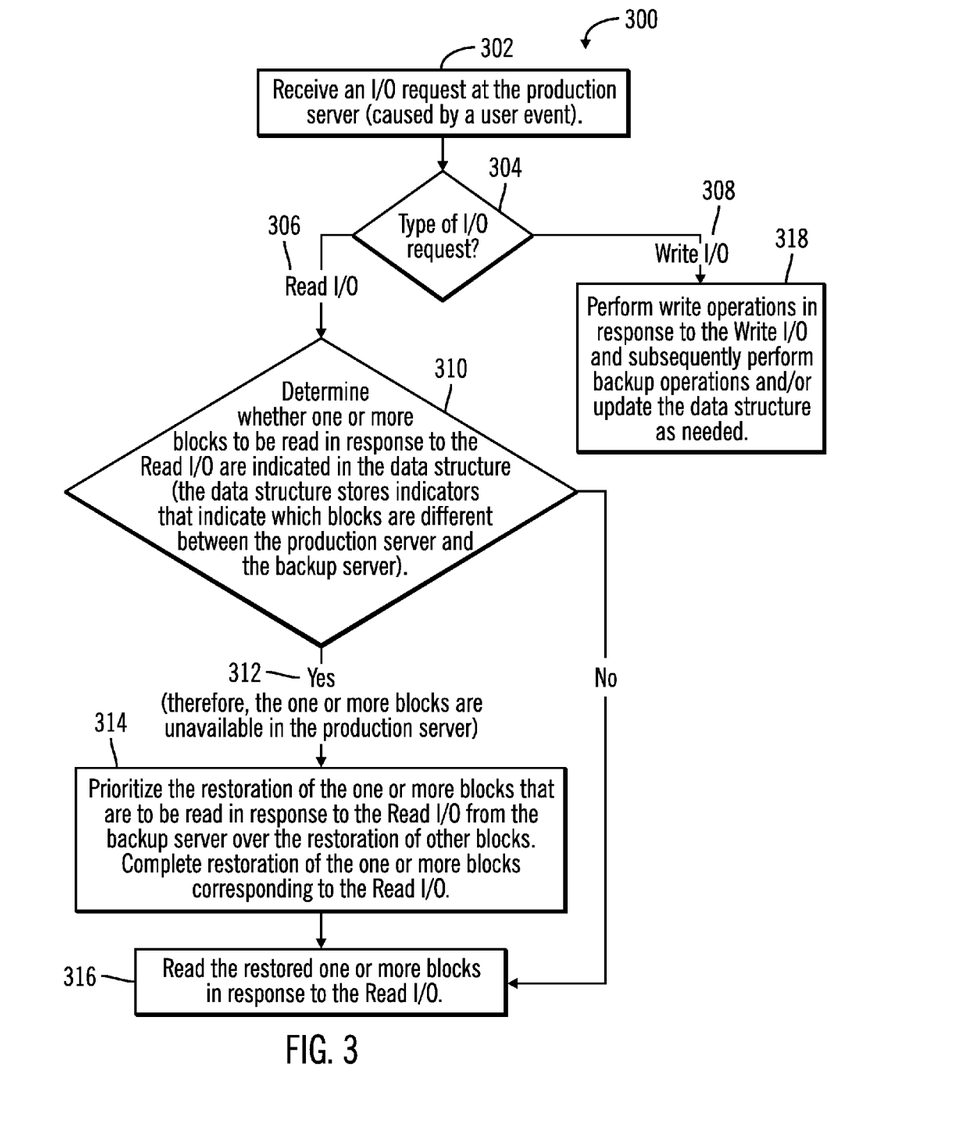
FIG. 3 illustrates a block diagram that shows first operations, in accordance with certain embodiments.

FIG. 3 illustrates a block diagram that shows first operations 300, in accordance with certain embodiments. The first operations 300 may be performed at least by the application 108 that executes in the production server 102.

Control starts at block 302 in which the production server 102 receives an I/O request, wherein the I/O request may be caused by a user event. The production server 102 determines (at block 304) the type of I/O request that has been received, wherein the type of I/O request may be a read I/O 306 or a write I/O 308.

If the production server 102 determines (at block 304) that the type of I/O request is a read I/O 306 then control proceeds to block 310, in which the production server 102 determines whether one or more blocks to be read in response to the read I/O are indicated in the data structure 112. The data structure 112 stores indicators that indicate which blocks are different between the production server 102 and the backup server 104. For example, in certain exemplary embodiments described in FIG. 2, the read I/O 306 may require the reading of block D 218*d* and the production server 102 may determine whether block D 218*d* is indicated in the exemplary data structure 212.

If at block 310, the production server 102 determines that one or more blocks to be read in response to the read I/O 306 are indicated in the data structure 112 then the one or more blocks are unavailable 312 in the production server 102 and the production server 102 prioritizes (at block 314) the restoration of the one or more blocks that are to be read in response to the read I/O 306 from the backup server 104 over the restoration of other blocks. For example, in certain exemplary embodiments described in FIG. 2, the production server 202 may determine that block D 218*d* is indicated via indicator 224 in the exemplary data structure 212 and may preferentially restore block D 218*d* over block B 218*b* that is also indicated (via indicator 222) in the exemplary data structure 212. The production server 102 then completes the restoration of the one or more blocks corresponding to the read I/O 306 and reads (at block 316) the restored one or more blocks in response to the read I/O 306.

If the production server 102 determines (at block 304) that the type of I/O request is a write I/O 308 then control proceeds to block 318 in which the production server 102 perform write operations in response to the write I/O 308 and subsequently performs backup operations and/or updates of the data structure 112 as needed.

Therefore, FIG. 3 illustrates certain operations in which the production server 102 prioritizes the restoration of the one or more blocks that are to be read in response to a read I/O over the restoration of other blocks.

Figure 4:
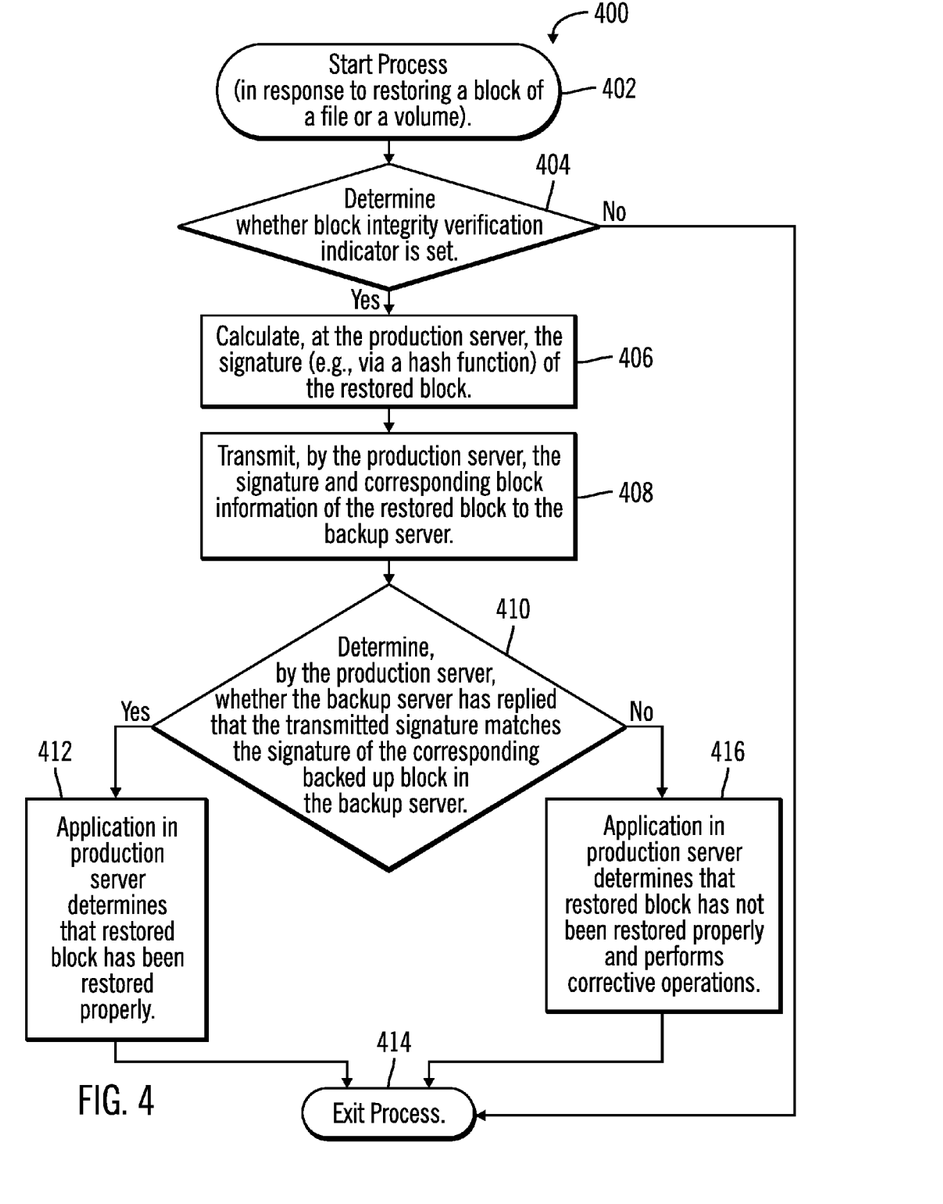
FIG. 4 illustrates a block diagram that shows second operations, in accordance with certain embodiments.

FIG. 4 illustrates a block diagram that shows second operations 400, in accordance with certain embodiments. The second operations 400 may be performed at least by the application 108 that executes in the production server 102.

Control starts (at block 402) in response to restoring a block of a file or a volume, wherein data stored in the file or the volume are stored in a plurality of blocks corresponding to the file or the volume. A volume may store a plurality of files, wherein data for each file may be stored in one or more blocks.

Control proceeds to block 404 in which the production server 102 determines whether the block integrity verification indicator 114 is set. If so, the production server 102 may calculate (at block 406) the signature of the restored block. In certain embodiments the signature of the restored block may be calculated by applying a hash function to the data contained in the restored block.

The production server 102 transmits (at block 408), the signature and corresponding block information of the restored block to the backup server 104. The production server 102 determines (at block 410) whether the backup server has replied that the transmitted signature matches the signature of the corresponding backed up block in the backup server 104. If so, then the application 108 in the production server 102 determines (at block 412) that the restored block has been restored properly and the process exits (at block 414). If not, then the application 108 in the production server 102 determines (at block 416) that the restored block has not been restored properly and performs corrective operations, and the process exits (at block 414).

If at block 404 the production server 102 determines that the block integrity verification indicator 114 is not set, then no integrity check for restored blocks have to be performed and the process exits (at block 414).

Therefore, FIG. 4 illustrates certain embodiments in which the production server 102 checks the data integrity of restored blocks, if the block integrity verification indicator 114 indicates that the data integrity of any received block at the production server 102 is to be checked.

Figure 5:
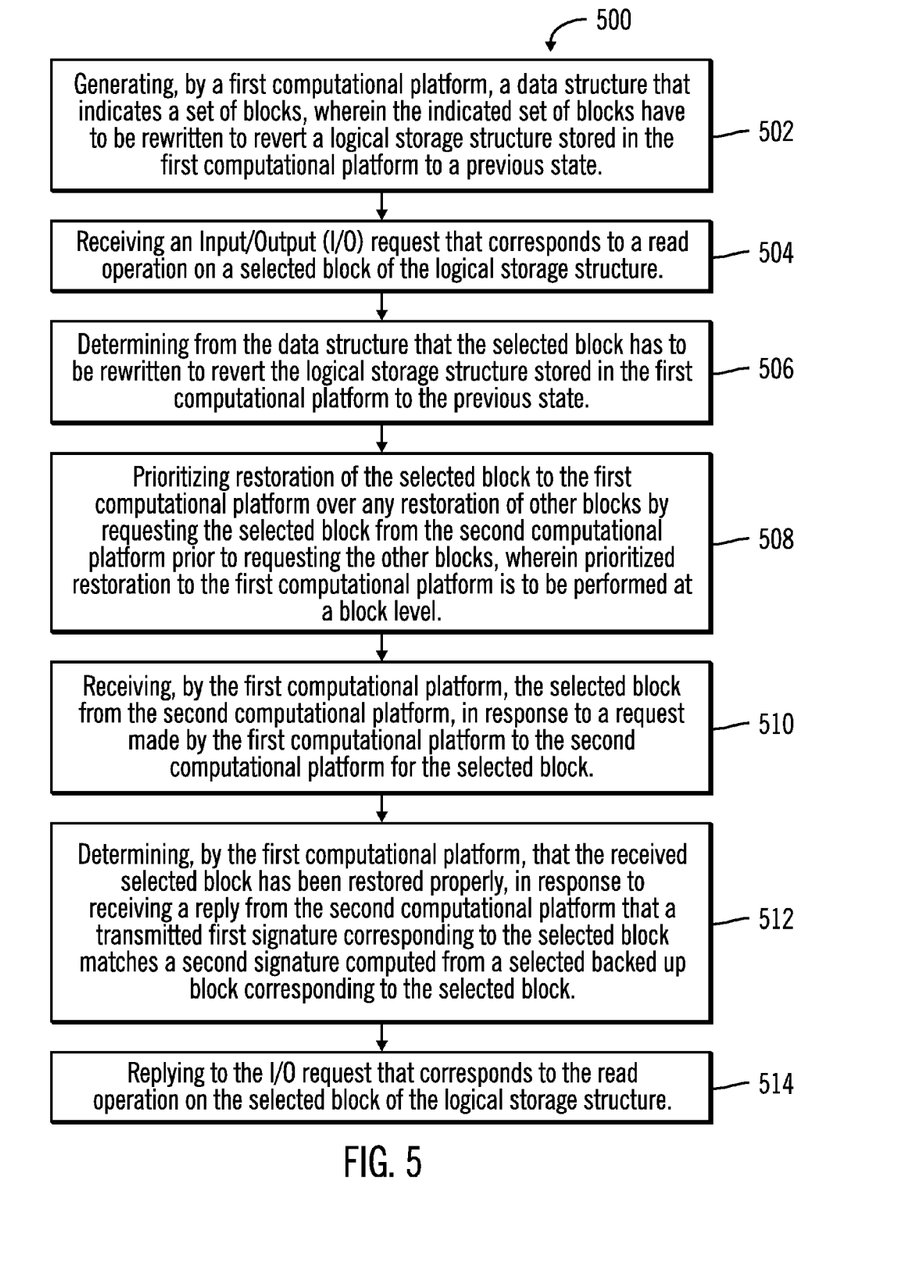
FIG. 5 illustrates a block diagram that shows third operations, in accordance with certain embodiments.

FIG. 5 illustrates a block diagram that shows third operations 500, in accordance with certain embodiments. The third operations 500 may be performed at least by the application 108 that executes in the production server 102.

Control starts at block 502, in which a first computational platform 102 generates a data structure 112 that indicates a set of blocks, wherein the indicated set of blocks have to be rewritten to revert a logical storage structure 110 stored in the first computational platform 102 to a previous state. For example, in FIG. 2 the indicators 222, 224 indicated in the exemplary data structure 212 indicates that block B 218b and block D 218d that have changed in the production server 202 have to rewritten to revert the exemplary file 210 to a previous state (e.g., a state corresponding to the last successful backup).

The first computational platform 102 receives (at block 504) an I/O request that corresponds to a read operation on a selected block of the logical storage structure 110. The first computational platform 102 determines (at block 506) from the data structure 112 that the selected block has to be rewritten to revert the logical storage structure 110 stored in the first computational platform 102 to the previous state and control proceeds to block 508.

At block 508, the first computational platform 102 prioritizes the restoration of the selected block to the first computational platform 102 over any restoration of other blocks by requesting the selected block from the second computational platform 104 prior to requesting the other blocks, wherein prioritized restoration to the first computational platform 102 is to be performed at a block level. For example, in FIG. 2 block D 218d that is to be read and that has changed is indicated in the data structure 212, and block D 218d is restored prior to restoring block B 218b that has also changed.

The first computational platform 102 receives (at block 510) the selected block from the second computational platform 104, in response to a request made by the first computational platform 102 to the second computational platform 104 for the selected block. The first computational platform 102 determines (at block 512) that the received selected block has been restored properly, in response to receiving a reply from the second computational platform 104 that a transmitted first signature corresponding to the selected block matches a second signature computed from a selected backed up block corresponding to the selected block. The first computational platform 102 then replies (at block 514) to the I/O request that corresponds to the read operation on the selected block of the logical storage structure 110 because the block to be read has been restored with proper data integrity.

Therefore, FIGS. 1-5 illustrate certain embodiments for achieving instant restore through coordination with integrity verification and incremental restore and prioritized restore mechanisms.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
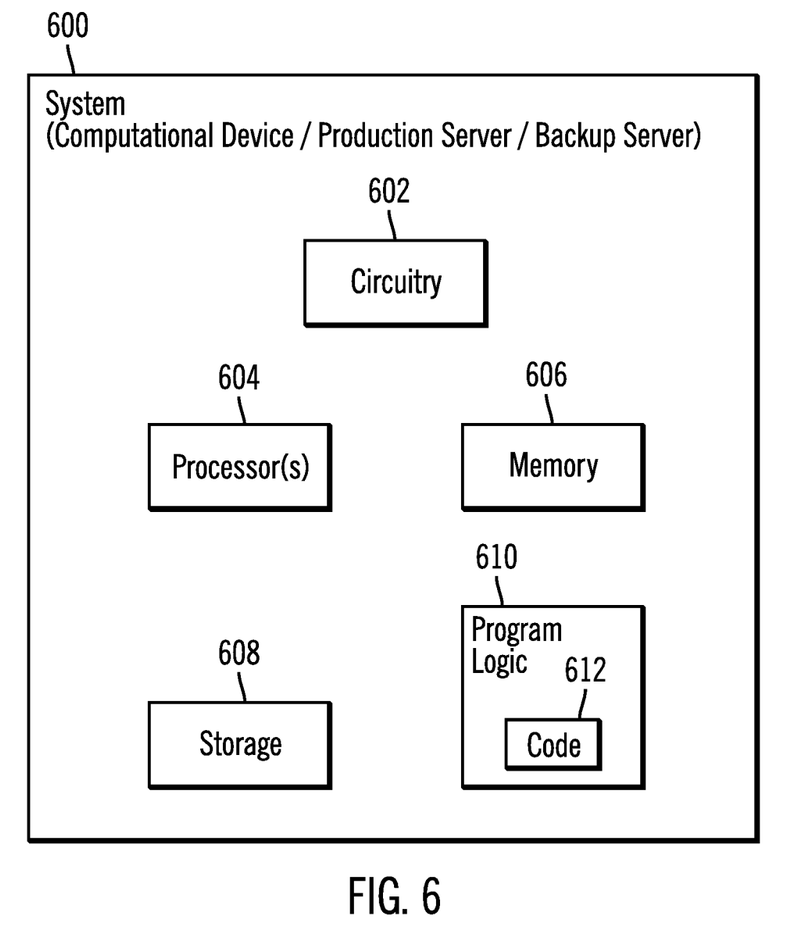
FIG. 6 illustrates a block diagram of a computational system that shows certain elements that may be included in the first and second computational platforms of FIG. 1, in accordance with certain embodiments.

FIG. 6 illustrates a block diagram that shows certain elements that may be included in the system 600 in accordance with certain embodiments. The system 600 may comprise the computational device 102, 104, 202, 204 and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
    generating, by a first computational platform, a data structure that indicates a set of blocks, wherein the data structure indicates that a first block of a logical storage structure is different between the first computational platform and a second computational platform, wherein a second block of the logical storage structure in the first computational platform is also different in the first computational platform and the second computational platform, wherein the first block and the second block are both corrupted in the first computational platform subsequent to being backed up in the second computational platform, wherein a third block is not corrupted in the first computational platform after being backed up in the second computational platform, wherein the first computational platform is a production server, wherein the second computational platform is a backup server, wherein the logical storage structure is a file, and wherein the first block, the second block, and the third block are data blocks included in the file;

receiving, by the first computational platform, an Input/Output (I/O) request;

determining a type of the I/O request received;

in response to determining that the type of the I/O request corresponds to a write I/O, performing write operations and subsequent to performing the write operations performing backup operations and update operations to the data structure;

in response to determining that the type of the I/O request corresponds to a read operation on the first block of the logical storage structure, performing:

in response to determining from the data structure that the first block that is corrupted must be rewritten to revert the logical storage structure stored in the first computational platform to a previous state, prioritizing restoration of the first block to the first computational platform over restoration of the second block by requesting the first block from the second computational platform prior to requesting the second block; and    receiving, by the first computational platform, the backed up version of the first block from the second computational platform in response to a request made by the first computational platform to the second computational platform for the first block that is both corrupted in the first computational platform and is needed for the read operation, wherein the restoration of the first block that is corrupted and needed for the read operation is prioritized over the restoration of the second block that is corrupted but not needed for the read operation, wherein the restoration of the second block that is corrupted but not needed for the read operation is prioritized over a restoration of the third block that is not corrupted and not needed for the read operation, and wherein the first block and the second block are rewritten to revert the logical storage structure stored in the first computational platform to the previous state; and in response to restoring a selected block from the backup server to the production server, performing:

determining whether a block integrity verification indicator maintained in the production server is set;

in response to determining that the block integrity verification indicator is set, performing:

determining, at the production server, a signature of the selected block that is restored;

transmitting, by the production server, the signature and corresponding block information of the selected block that is restored to the backup server;

determining, by the production server, whether the backup server has replied that the transmitted signature matches a signature of a backed up block corresponding to the selected block in the backup server; and      in response to determining that the backup server has replied that the transmitted signature does not match the signature of the backed up block corresponding to the selected block, determining, by the production server, that the restored block has not been restored properly, and performing corrective operations; and    in response to determining that the block integrity verification indicator is not set, avoiding performing an integrity check for the selected block that is restored.

2. The method of claim 1, wherein files and volumes are allowed to be used throughout a restore or incremental restore process even if the restore or the incremental restore process has not completed.

3. The method of claim 1, wherein the data structure is implemented as a bitmap.

4. A system, wherein the system is a first computational platform, and wherein the system is coupled to a second computational platform, the system comprising:

a memory; and a processor coupled to the memory, wherein the processor performs operations comprising:

generating, by the first computational platform, a data structure that indicates a set of blocks, wherein the data structure indicates that a first block of a logical storage structure is different between the first computational platform and the second computational platform, wherein a second block of the logical storage structure in the first computational platform is also different in the first computational platform and the second computational platform, wherein the first block and the second block are both corrupted in the first computational platform subsequent to being backed up in the second computational platform, wherein a third block is not corrupted in the first computational platform after being backed up in the second computational platform, wherein the first computational platform is a production server, wherein the second computational platform is a backup server, wherein the logical storage structure is a file, and wherein the first block, the second block, and the third block are data blocks included in the file;

receiving, by the first computational platform, an Input/Output (I/O) request;

determining a type of the I/O request received;

in response to determining that the type of the I/O request corresponds to a write I/O, performing write operations and subsequent to performing the write operations performing backup operations and update operations to the data structure;

in response to determining that the type of the I/O request corresponds to a read operation on the first block of the logical storage structure, performing:

in response to determining from the data structure that the first block that is corrupted must be rewritten to revert the logical storage structure stored in the first computational platform to a previous state, prioritizing restoration of the first block to the first computational platform over restoration of the second block by requesting the first block from the second computational platform prior to requesting the second block; and      receiving, by the first computational platform, the backed up version of the first block from the second computational platform in response to a request made by the first computational platform to the second computational platform for the first block that is both corrupted in the first computational platform and is needed for the read operation, wherein the restoration of the first block that is corrupted and needed for the read operation is prioritized over the restoration of the second block that is corrupted but not needed for the read operation, wherein the restoration of the second block that is corrupted but not needed for the read operation is prioritized over a restoration of the third block that is not corrupted and not needed for the read operation, and wherein the first block and the second block are rewritten to revert the logical storage structure stored in the first computational platform to the previous state; and in response to restoring a selected block from the backup server to the production server, performing:
   determining whether a block integrity verification indicator maintained in the production server is set;
   in response to determining that the block integrity verification indicator is set, performing:
      determining, at the production server, a signature of the selected block that is restored;
      transmitting, by the production server, the signature and corresponding block information of the selected block that is restored to the backup server;
      determining, by the production server, whether the backup server has replied that the transmitted signature matches a signature of a backed up block corresponding to the selected block in the backup server; and
      in response to determining that the backup server has replied that the transmitted signature does not match the signature of the backed up block corresponding to the selected block, determining, by the production server, that the restored block has not been restored properly, and performing corrective operations; and
   in response to determining that the block integrity verification indicator is not set, avoiding performing an integrity check for the selected block that is restored.

5. The system of claim 4, wherein files and volumes are allowed to be used throughout a restore or incremental restore process even if the restore or the incremental restore process has not completed.

6. The system of claim 4, wherein the data structure is implemented as a bitmap.

7. A computer program product comprising a non-transitory computer readable storage medium having computer readable program code embodied therewith, the computer readable program code configured to perform operations comprising:
   generating, by a first computational platform, a data structure that indicates a set of blocks, wherein the data structure indicates that a first block of a logical storage structure is different between the first computational platform and a second computational platform, wherein a second block of the logical storage structure in the first computational platform is also different in the first computational platform and the second computational platform, wherein the first block and the second block are both corrupted in the first computational platform subsequent to being backed up in the second computational platform, wherein a third block is not corrupted in the first computational platform after being backed up in the second computational platform, wherein the first computational platform is a production server, wherein the second computational platform is a backup server, wherein the logical storage structure is a file, and wherein the first block, the second block, and the third block are data blocks included in the file;
   receiving, by the first computational platform, an Input/Output (I/O) request;
   determining a type of the I/O request received;
   in response to determining that the type of the I/O request corresponds to a write I/O, performing write operations and subsequent to performing the write operations performing backup operations and update operations to the data structure;
   in response to determining that the type of the I/O request corresponds to a read operation on the first block of the logical storage structure, performing:
      in response to determining from the data structure that the first block that is corrupted must be rewritten to revert the logical storage structure stored in the first computational platform to a previous state, prioritizing restoration of the first block to the first computational platform over restoration of the second block by requesting the first block from the second computational platform prior to requesting the second block; and
      receiving, by the first computational platform, the backed up version of the first block from the second computational platform in response to a request made by the first computational platform to the second computational platform for the first block that is both corrupted in the first computational platform and is needed for the read operation, wherein the restoration of the first block that is corrupted and needed for the read operation is prioritized over the restoration of the second block that is corrupted but not needed for the read operation, wherein the restoration of the second block that is corrupted but not needed for the read operation is prioritized over a restoration of the third block that is not corrupted and not needed for the read operation, and wherein the first block and the second block are rewritten to revert the logical storage structure stored in the first computational platform to the previous state; and
   in response to restoring a selected block from the backup server to the production server, performing:
      determining whether a block integrity verification indicator maintained in the production server is set;
      in response to determining that the block integrity verification indicator is set, performing:
         determining, at the production server, a signature of the selected block that is restored;
         transmitting, by the production server, the signature and corresponding block information of the selected block that is restored to the backup server;
         determining, by the production server, whether the backup server has replied that the transmitted signature matches a signature of a backed up block corresponding to the selected block in the backup server; and
         in response to determining that the backup server has replied that the transmitted signature does not match the signature of the backed up block corresponding to the selected block, determining, by the production server, that the restored block has not been restored properly, and performing corrective operations; and
      in response to determining that the block integrity verification indicator is not set, avoiding performing an integrity check for the selected block that is restored.

8. The computer program product of claim 7, wherein files and volumes are allowed to be used throughout a restore or incremental restore process even if the restore or the incremental restore process has not completed.

9. The computer program product of claim 7, wherein the data structure is implemented as a bitmap.

10. A method for deploying computing infrastructure comprising integrating computer readable program code into a first computational platform, wherein the first computational platform is coupled to a second computational platform, and wherein the computer readable program code in combination with the first computational platform performs operations comprising:

generating, by the first computational platform, a data structure that indicates a set of blocks, wherein the data structure indicates that a first block of a logical storage structure is different between the first computational platform and the second computational platform, wherein a second block of the logical storage structure in the first computational platform is also different in the first computational platform and the second computational platform, wherein the first block and the second block are both corrupted in the first computational platform subsequent to being backed up in the second computational platform, wherein a third block is not corrupted in the first computational platform after being backed up in the second computational platform, wherein the first computational platform is a production server, wherein the second computational platform is a backup server, wherein the logical storage structure is a file, and wherein the first block, the second block, and the third block are data blocks included in the file;

receiving, by the first computational platform, an Input/Output (I/O) request;

determining a type of the I/O request received;

in response to determining that the type of the I/O request corresponds to a write I/O, performing write operations and subsequent to performing the write operations performing backup operations and update operations to the data structure;

in response to determining that the type of the I/O request corresponds to a read operation on the first block of the logical storage structure, performing:

in response to determining from the data structure that the first block that is corrupted must be rewritten to revert the logical storage structure stored in the first computational platform to a previous state, prioritizing restoration of the first block to the first computational platform over restoration of the second block by requesting the first block from the second computational platform prior to requesting the second block; and receiving, by the first computational platform, the backed up version of the first block from the second computational platform in response to a request made by the first computational platform to the second computational platform for the first block that is both corrupted in the first computational platform and is needed for the read operation, wherein the restoration of the first block that is corrupted and needed for the read operation is prioritized over the restoration of the second block that is corrupted but not needed for the read operation, wherein the restoration of the second block that is corrupted but not needed for the read operation is prioritized over a restoration of the third block that is not corrupted and not needed for the read operation, and wherein the first block and the second block are rewritten to revert the logical storage structure stored in the first computational platform to the previous state; and in response to restoring a selected block from the backup server to the production server, performing:

determining whether a block integrity verification indicator maintained in the production server is set;

in response to determining that the block integrity verification indicator is set, performing:

determining, at the production server, a signature of the selected block that is restored;

transmitting, by the production server, the signature and corresponding block information of the selected block that is restored to the backup server;

determining, by the production server, whether the backup server has replied that the transmitted signature matches a signature of a backed up block corresponding to the selected block in the backup server; and in response to determining that the backup server has replied that the transmitted signature does not match the signature of the backed up block corresponding to the selected block, determining, by the production server, that the restored block has not been restored properly, and performing corrective operations; and in response to determining that the block integrity verification indicator is not set, avoiding performing an integrity check for the selected block that is restored.

11. The method for deploying computing infrastructure of claim 10, wherein files and volumes are allowed to be used throughout a restore or incremental restore process even if the restore or the incremental restore process has not completed.

12. The method for deploying computing infrastructure of claim 10, wherein the data structure is implemented as a bitmap.

* * * * *